United States Patent [19]

Herger et al.

[11] 3,854,674

[45] Dec. 17, 1974

[54] TAPE DRIVE UNIT WITH OFFSET BACKPLATE

[75] Inventors: Zoltan L. Herger, Northglenn; Thomas S. Kavanagh, Boulder; Dennis R. Olmsted, Westminster; Ronald R. Campbell, Boulder, all of Colo.

[73] Assignee: Storage Technology Corporation, Boulder, Colo.

[22] Filed: Aug. 17, 1973

[21] Appl. No.: 389,125

Related U.S. Application Data

[63] Continuation of Ser. No. 139,708, May 3, 1971, abandoned.

[52] U.S. Cl. .................... 242/182, 226/95, 242/186

[51] Int. Cl. .... B65h 59/38, G03b 1/04, G11b 15/32

[58] Field of Search ........................... 242/182–186; 226/95, 97

[56] References Cited

UNITED STATES PATENTS

| | | | |
|---|---|---|---|
| 3,092,344 | 6/1963 | Dinsmore et al. | 242/210 |
| 3,393,878 | 7/1968 | Aweida et al. | 242/182 |
| 3,664,610 | 5/1972 | Sasseen | 242/210 |

*Primary Examiner*—Leonard D. Christian
*Attorney, Agent, or Firm*—Woodcock, Washburn, Kurtz & Mackiewicz

[57] ABSTRACT

In a magnetic tape unit, guides are mounted on the back plate above the tape buffer vacuum columns. The back plate is offset to form one side of a threading guide which is wider than the guides through which the tape travels during normal operation of the unit. The glass in the vacuum column door of the cabinet forms the outside wall of the threading guides when the door is closed. A tape trough is mounted on the door to provide a path for the tape to travel under the head when the door is closed. The guides, upper air bearings, magnetic read/write head, head and skew block assembly, threading guides, beginning of tape-/end of tape (BOT/EOT), low speed area sensor (LSA), high speed rewind foot assembly (HSRW), erase head, and tape cleaner are all mounted on the back plate which can be easily removed from the machine for service, or for changing the components that determine the magnetic tape path. The tapered vacuum columns are asymmetrical, one with respect to the other, to improve tape tension over the head and capstan. The tape cleaner has a blade and a perforated vacuum plate for pulling the magnetic tape into proximity to the blade.

10 Claims, 7 Drawing Figures

TAPE DRIVE UNIT WITH OFFSET BACKPLATE

This is a continuation of application Ser. No. 139,708, filed May 3, 1971 and now abandoned.

BACKGROUND OF THE INVENTION

This invention relates to high performance tape drives and more particularly to improvements in the components defining the tape path.

High performance digital magnetic tape drives are extensively used in computing systems. One example of a high performance magnetic tape unit is the IBM 2420 Model 5 Magnetic Unit described in the IBM Systems Reference Library Bulletin, file No. S/360–05. Units such as this include a file reel, a machine reel and a capstan for driving the magnetic tape past the heads and between the file reel and the machine reel. In order to minimize the mass of the tape to be accelerated by the capstan, short columns, sometimes referred to as tapered columns decouple the tape mass from the driving capstan. The components which define the tape path between the reels, through vacuum columns and over the magnetic head are critical. Accessibility of these components for servicing is important. Positioning and structuring of these components to provide a smooth, flutter-free, tape path between the reels is important.

SUMMARY OF THE INVENTION

In accordance with an important aspect of this invention the back plate in a tape drive unit is offset above the guide to form one side of a threading guide which is wider than the width of the tape guide.

A glass is mounted on the door to form the other wall for the threading guide when the door is closed.

In accordance with another aspect of this invention the tape drive unit has two tapered columns which are asymmetrical, one with respect to the other, to improve tape tension over the head and capstan.

In accordance with another aspect of this invention a tape cleaner has a blade and a perforated vacuum plate which draws the tape into contact with the blade.

In accordance with another aspect of this invention one of the tape guides is separated from the adjacent air bearing to improve the operating characteristics of both.

In accordance with another aspect of this invention all of the components which define the tape path between the reels are mounted on a back plate which is easily removable from the machine for servicing or modification of the tape path.

In accordance with another aspect of this invention a high speed rewind foot is selectively actuated during high speed rewind to push the magnetic tape away from the read/write head during high speed rewind.

In accordance with another aspect of this invention the tape trough which forms a path for the tape as it travels past the read/write head is mounted on the door so that when the door is open the tape trough is moved out of the way to allow easy accessibility to the read/write head.

DESCRIPTION OF A PARTICULAR EMBODIMENT

Figure 1:
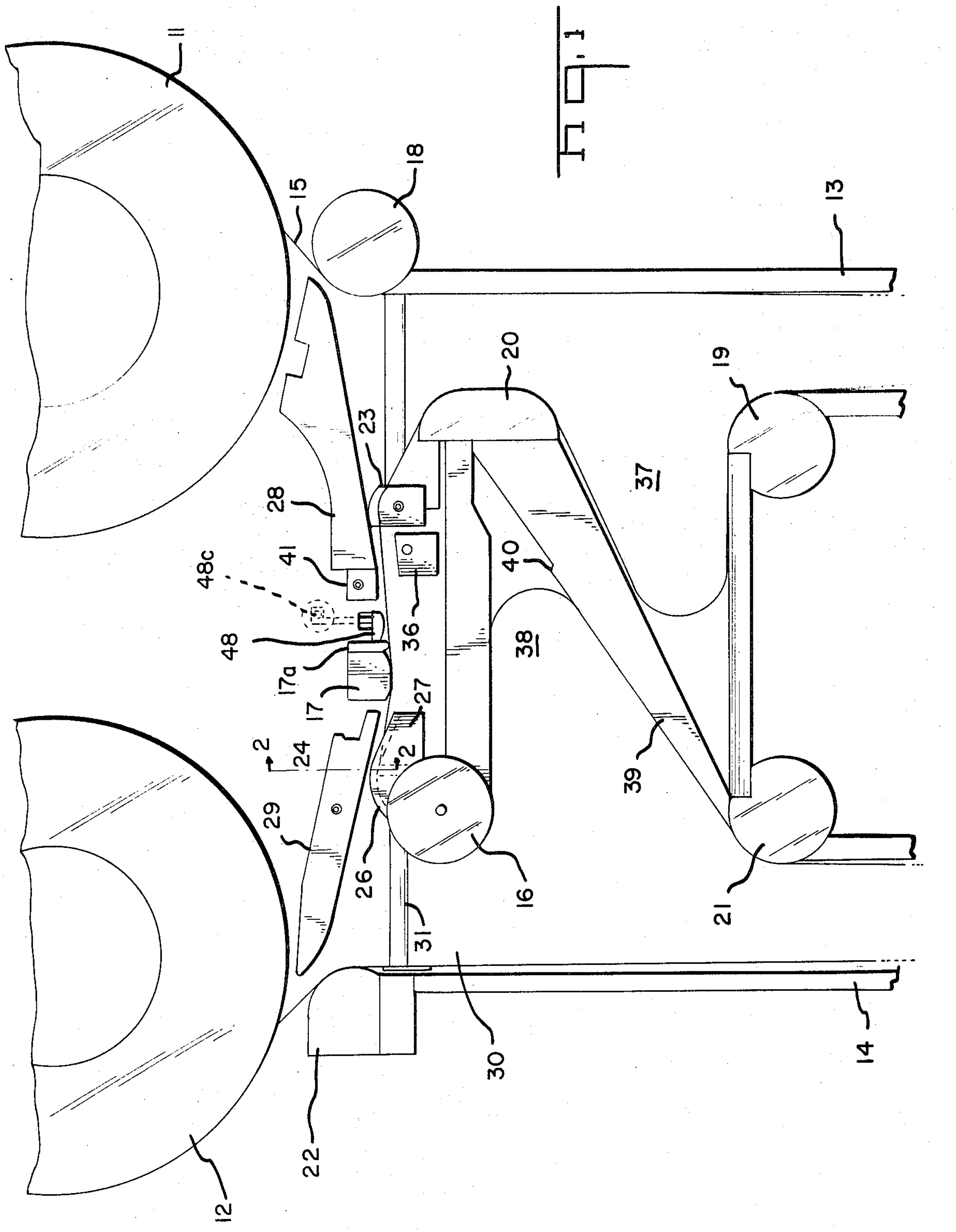
FIG. 1 shows the components which define the tape path.

Referring to the drawings there is shown a magnetic tape recording and reproducing system which includes a file reel 11 and a machine reel 12. Two tape vacuum columns 13 and 14 decouple the inertia of the magnetic tape 15 from the single capstan 16 which drives the tape past the magnetic heads. These heads include a read/write head 17 and an erase head 17*a*. The tape path between the file reel and the machine reel is formed by air bearings 18–22 and by guides 23 and 24.

Figure 2:
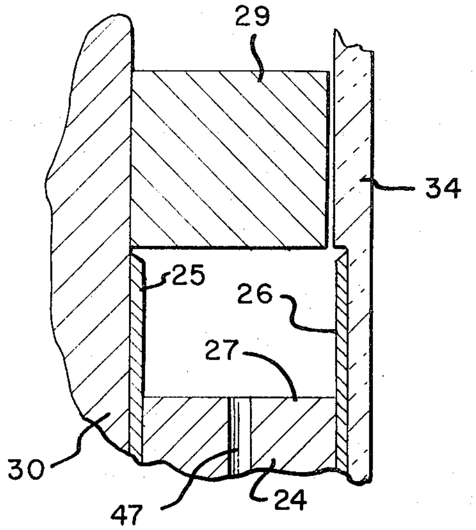
FIG. 2 is a view through section 2—2.
Figure 3:
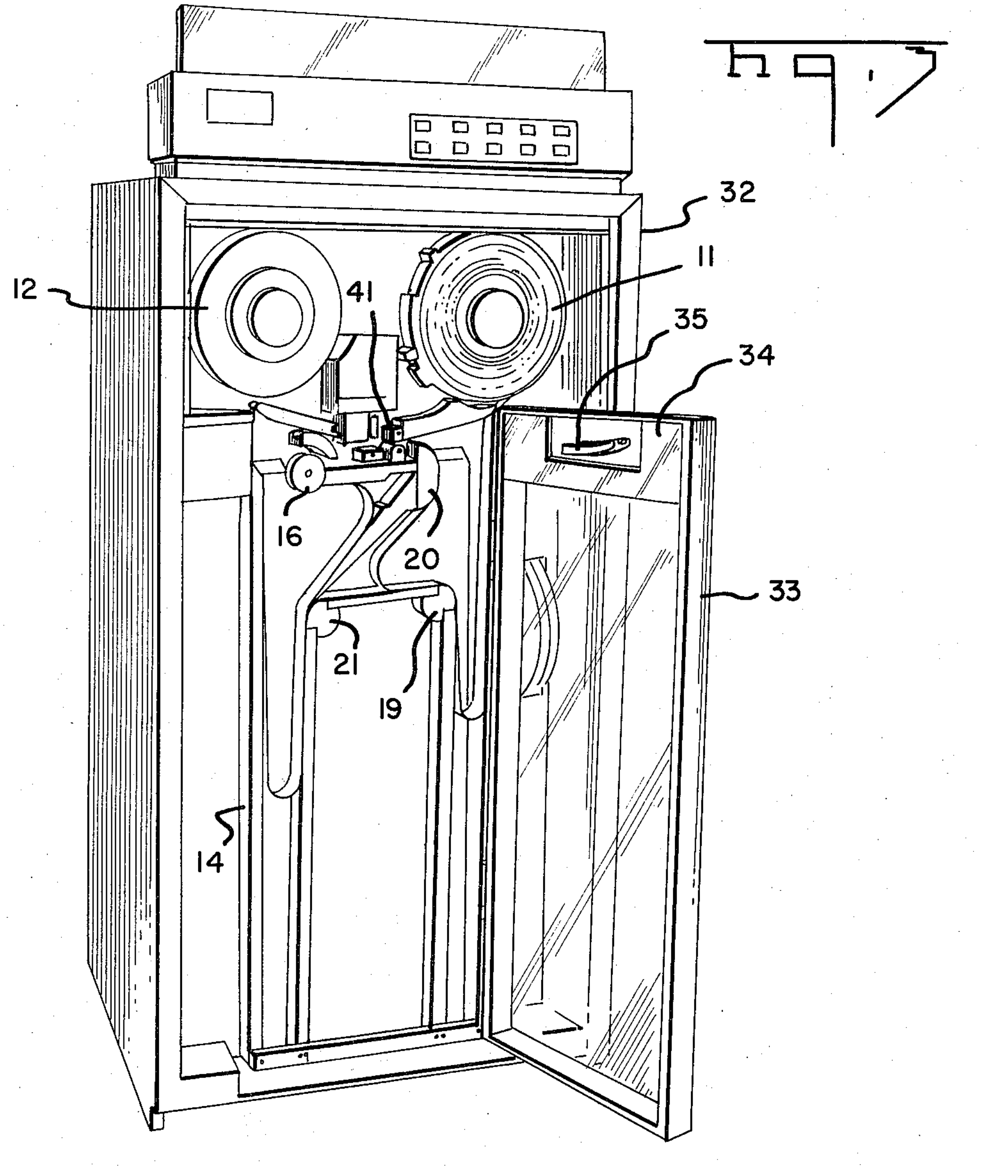
FIG. 3 shows the overall unit with the door opened.

Guide 24 is mounted on the back plate 30 above the vacuum column 14 which is adjacent to the machine reel. Ceramic guide flange 25 and 26 (FIG. 2) define a width which guides the tape over the guide member 27 during a read/write, or a rewind operation. The guide member 27 has a manifold hole 47 therein to provide air lubrication for the tape to prevent the tape from sticking to the guide when tape is not moving.

During a threading operation a wider guide width must be provided. Threading is accomplished by vacuum and pressure means such as that more fully described in U.S. Pat. No. 3,393,878 Aweida et al., dated July 23, 1968. The threading means includes airjets which emanate from the bottom of threading channels 28 and 29. The threading means also includes a plurality of vacuum holes in a sector of the hub on the machine reel 12. During a threading operation the leader of the tape on the file reel 11 is automatically guided by these airjets under the threading channels 28 and 29 and into contact with the hub on the machine reel 12. Upward airjets are provided in 22 to aid in bringing tape in contact with reel 12.

The back plate 30 is offset above the guide to form one side of a threading guide which is wider than the normal tape width. (As shown in FIG. 1, the offset begins at 31 which is below the top of the guide but the offset extends above the guide 24.) In the typical machine, the guide 24 has a width which is sufficient to accomodate one-half inch tape. The width of the threading guide is greater than the width of the guide 24.

The back plate 30 is mounted in the cabinet 32 so that the components which define the tape path are accessible through the open front of this cabinet. The door 33 closes this front opening. A glass plate 34 is mounted in the door. When the door is closed the glass plate 34 provides a relatively airtight seal. The glass plate 34 also forms the other wall of the threading guide. Also mounted on the door 33 is a spring leaded tape trough 35. When the door is closed, the tape trough 35 is positioned between the guide 24 and a tape sensor 36. The tape trough 35 provides a path for the tape as it passes beneath the magnetic heads 17 and 17*a*. Positioning of the tape trough on the door is particularly advantageous because when the door is opened the trough is moved completely out of the way to provide easy accessibility to the magnetic heads.

Referring to FIG. 1 the magnetic tape unit further includes a first tapered column 37 between the tape vacuum column 13 and the magnetic head 17. A second tapered column 38 is positioned between the magnetic head 17 and the other tape vacuum column 14. The diagonal member 39 forms one side of both of the tapered columns 37 and 38. The member 39 has a taper which makes the tapered column 38 asymmetrical with respect to the tapered column 37. This asymmetry is important to maintain proper tape tension. In the aforementioned IBM 2420 tape drive the left hand slack tape column is narrower than the right hand slack tape column. This provides extra tape tension over the capstan to aid in backward tape start. The wide angle tapered column 38 maintains good tension over the capstan 16 because as the capstan pulls column 38 on a backward start the wide angle 38 exposes a larger area of the tape to vacuum at a high rate of speed so the loop will be drawn back into column 38 thus aiding to insure that tape doesn't slip on the capstan. The shallow angle on remain substantially column 37 means that the tape tension across the head will stay more constant because the cross section of the tape loop in column 37 will stay more constant as the loop moves back and forth in column 37.

Figures 4A, 4B, 4C, 5:
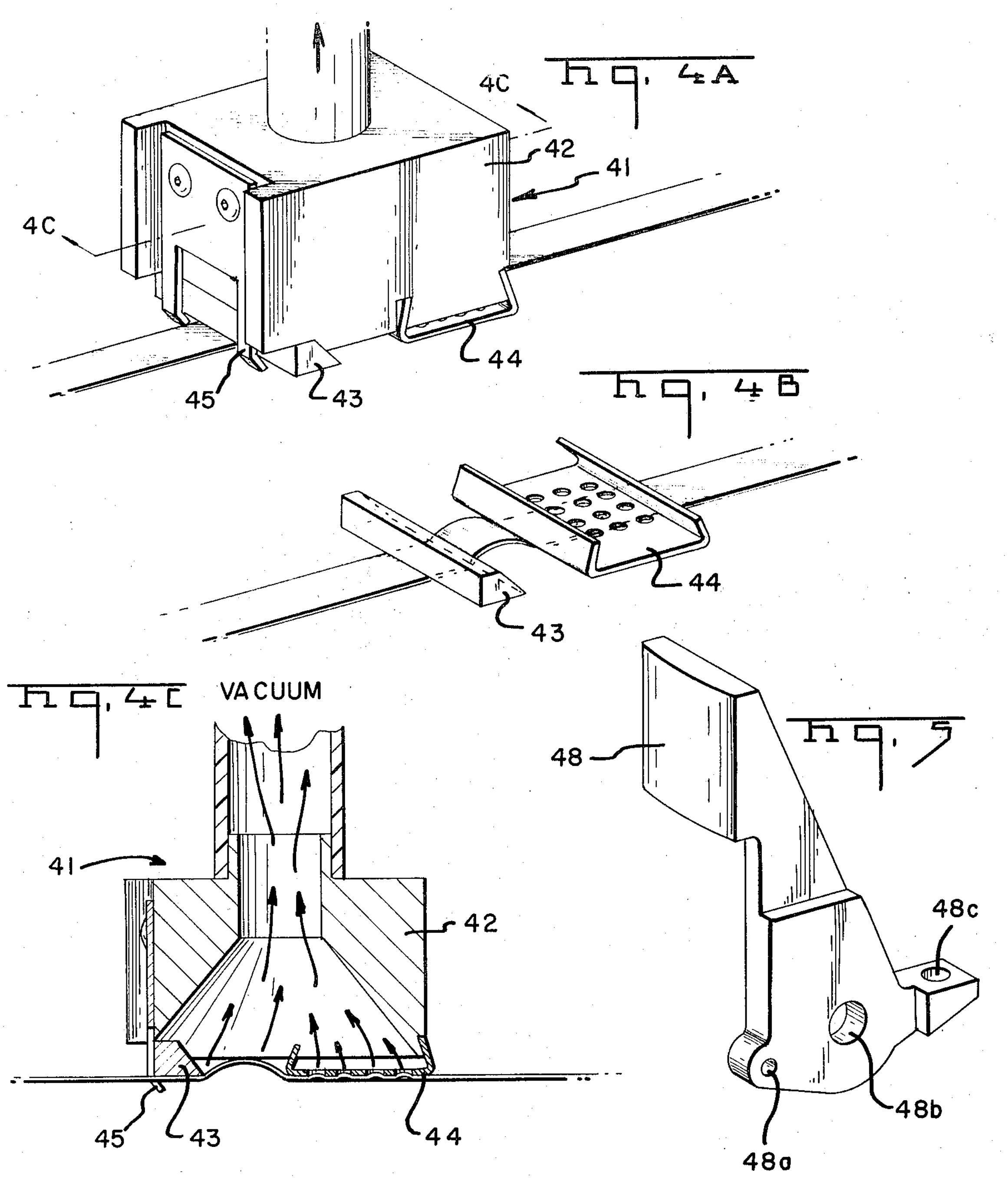
FIGS. 4A–4C show the tape cleaner.
FIG. 5 is an enlarged view of the high speed rewind foot.

A tape cleaner 41 is positioned in the path of the magnetic tape between the file reel 11 and the machine reel 12. The tape cleaner is shown in more detail in FIGS. 4A–4C. The tape cleaner includes a housing 42 to which a blade 43 and a perforated plate 44 are attached. The cleaner is positioned in the tape path so that it is slightly above the path of the tape and to one side of the read/write head. In operation, vacuum is applied to the cleaner housing 42. This causes the magnetic tape to adhere to the perforated plate 44 and to form a wave-like bubble between the blade 43 and the perforated plate 44. The tape assumes a relationship with the blade which forms a suitable cleaning angle. When the tape is in mption, approaching the read/write head 17 from the cleaner side (forward tape motion), it first contacts the perforated plate. The sharp edges of the perforations loosen unwanted particles and dirt by mechanical impact. Several perforations are in sequence in the direction of tape motion. The loosened particles are removed by the blade which has its cutting edge facing the tape motion. Openings in the housing close to the blade and perforated plate create a turbulent air flow which is required for the removal of loose particles from the housing.

When the direction of tape motion is reversed, the tape contacts the back side of the blade 43. The back side of the blade 43 has no cutting edges but provides a smooth flat surface that acts as a hydro-dynamic air bearing when the tape speed is sufficiently high. Independent from this action, the perforated plate 44 performs a gentle cleaning action. In accordance with this invention, the combination of the perforated plate 44 and the blade 43 produces a harsh cleaning action in the forward tape direction and a more gentle cleaning action in the backward tape direction.

FIG. 1 illustrates another advantageous feature of this invention. The second guide 23 is disposed on the opposite side of the magnetic head from the first guide 24. An air bearing 20 is positioned adjacent the second guide 23 for guiding the tape into the tapered column 37. Separation of the air bearing and the guide has not been made in prior art devices. Separation of the guide and the air bearing in accordance with this invention provides improved performance. This aids in reading and writing compatibility with other tape drives that record NRZI.

In accordance with another aspect of this invention there is provided a high speed rewind foot 48. This foot is spring loaded to its normal position shown in FIG. 1. Upon initiation of a high speed rewind operation, a solenoid is actuated which lowers the rewind foot 48. This pushes the magnetic tape away from the heads 17 and 17a. This prevents undue wear and contamination caused by high speed rewind in contact with the magnetic heads. The high speed rewind foot 48 is shown in more detail in FIG. 5. The foot is pivoted at **48*b*. A spring connected to 48*a* normally biases the foot to the position shown in FIG. 1. In high speed rewind, a solenoid, connected to 48*c*, is actuated, causing the foot to push the tape away from the heads 17 and 17*a*.** The foot is designed to provide a self-lubricated air bearing surface to the tape to minimize tape wear during high speed rewind.

In accordance with another important feature of this invention, all of the components which define the tape path are mounted on the removable back plate 30. These components include outboard air bearings 22 and 18, first and second guides 24 and 23, capstan 16, air bearing 20, tape cleaner 41, magnetic heads 17 and **17*a* and high speed rewind foot 48, thread channels 29 and 28. and tape sensors 36 and 49.**

While a particular embodiment of the invention and certain modifications have been described, other modifications may be made. The following claims are, therefore, intended to cover any such modifications within the true spirit and scope of the invention.

What is claimed is:

1. A magnetic tape unit comprising:
- a cabinet for said tape unit,
- a file reel and a machine reel,
- a magnetic head mounted intermediate said reels,
- a capstan for driving magnetic tape in both directions past said head and between said reels,
- means for threading said magnetic tape from said file reel to said machine reel,
- a pair of tape vacuum buffer columns each having an open end disposed adjacent one of said reels on opposite sides of said magnetic head,
- a guide positioned above the vacuum column adjacent said machine reel, said guide having a width which accommodates magnetic tape of normal width which guides said tape through said vacuum column during normal operation,
- a back plate, said guide and said head being mounted on said back plate, said back plate having an offset portion which extends above said guide, said offset portion of said back plate forming one side of a threading guide which is wider than said width of said guide, said back plate being mounted in said cabinet so that said guide and said head are accessible through the open front of said cabinet,
- a door for closing the front opening of said cabinet, and
- a glass plate mounted on said door to form the other wall of said threading guide when said door is closed, said glass plate providing a relatively airtight seal between said vacuum columns and said back plate.

2. The unit recited in claim 1 further comprising:
- a cabinet enclosing said tape unit and having a front opening therein, a door closing the front opening of said cabinet, and a tape trough mounted on said door, said trough being positioned when said door is closed, to provide a path for said tape to travel past said heads.

3. The unit recited in claim 1 further comprising:
a first tapered column between the slack tape vacuum column adjacent said file reel and said magnetic head,
a second tapered column between said magnetic head and the other slack tape vacuum column, said second tapered column being asymmetrical with respect to said first tapered column to maintain proper tape tension.

4. The unit recited in claim 3 further comprising a diagonal member forming one side of both tapered columns, said member having a taper thereon to make said one tapered column asymmetrical with respect to the other.

5. The unit recited in claim 1 further including a tape cleaner in the path of said magnetic tape between said file reel and said machine reel, said tape cleaner comprising:
a blade disposed transversely across said tape path, a perforated plate, and
means for supplying a vacuum to said perforated plate causing said magnetic tape to adhere to the perforated plate so that said tape travels across said blade.

6. The unit recited in claim 1 wherein said guide includes two guide flanges defining the guide width between them, and a curved drive member over which said tape travels, said guide member being curved with a wrap angle grater than 20° to increase the apparent stiffness of said tape to make it easier to guide.

7. The unit recited in claim 6 wherein said guide member has a hole therein, and
means for supplying air to said hole to provide air lubrication for said tape.

8. The unit recited in claim 1 wherein said guide is a first guide located adjacent said capstan, said unit further comprising:
a second guide disposed on the other side of said magnetic head from said first guide, and
an air bearing adjacent said second guide for guiding said tape into one side of said tapered column.

9. The unit recited in claim 8 further comprising:
a tape cleaner, first and second inboard air bearings disposed adjacent the sides of said slack tape vacuum columns and defining, together with said first and second guides, said capstan and said air bearing adjacent said second guide, a tape path between said file reel and said machine reel, said first and second guides, said magnetic head, said tape cleaner, said air bearing, and said first and second outboard air bearings all being mounted on said back plate so that all of the components defining said tape path are easily removable from said unit by removing said back plate.

10. The unit recited in claim 1 further comprising:
a back plate, said guide, said capstan and said magnetic head being mounted on said back plate,
a rewind foot mounted on said back plate, said rewind foot being selectively actuated during a rewind operation to push said magnetic tape away from said magnetic head.

* * * * *

PO-1050
(5/69)

UNITED STATES PATENT OFFICE
CERTIFICATE OF CORRECTION

Patent No. 3,854,674 Dated December 17, 1974

Inventor(s) Zoltan L. Herger et al.

It is certified that error appears in the above-identified patent and that said Letters Patent are hereby corrected as shown below:

Page 1, section [75] Inventors, should read:

Zoltan L. Herger, Northglenn;
Thomas S. Kavanagh, Boulder;
Dennis R. Olmsted, Westminster;
Ronald R. Campbell, Boulder;
--Richard H. Ralston, Boulder,--
all of Colo.

Signed and Sealed this

*twenty-eight* Day of *October 1975*

[SEAL]

*Attest:*

RUTH C. MASON
*Attesting Officer*

C. MARSHALL DANN
*Commissioner of Patents and Trademarks*